(12) United States Patent
Correa Parker

(10) Patent No.: US 9,824,520 B2
(45) Date of Patent: Nov. 21, 2017

(54) METHOD AND SYSTEM OF ELECTRONIC VOTING IMPLEMENTED IN A PORTABLE DEVICE

(71) Applicant: Cesar Ramon Juan Correa Parker, Santiago (CL)

(72) Inventor: Cesar Ramon Juan Correa Parker, Santiago (CL)

( * ) Notice: Subject to any disclaimer, the term of this patent is extended or adjusted under 35 U.S.C. 154(b) by 0 days.

(21) Appl. No.: 14/935,202

(22) PCT Filed: Jan. 21, 2015

(86) PCT No.: PCT/CL2015/000004
§ 371 (c)(1),
(2) Date: Nov. 6, 2015

(87) PCT Pub. No.: WO2016/115646
PCT Pub. Date: Jul. 28, 2016

(65) Prior Publication Data
US 2017/0178438 A1    Jun. 22, 2017

(51) Int. Cl.
*G06K 17/00*    (2006.01)
*G07C 13/00*    (2006.01)

(52) U.S. Cl.
CPC .................................. *G07C 13/00* (2013.01)

(58) Field of Classification Search
USPC ........................................................ 235/386
See application file for complete search history.

(56) References Cited

U.S. PATENT DOCUMENTS

2002/0077886 A1    6/2002 Chung
2005/0101307 A1    5/2005 Brugge et al.
(Continued)

FOREIGN PATENT DOCUMENTS

EP    2455919 A2    5/2012
JP    2011028376 A    2/2011
WO    2012137035 A1    10/2012

*Primary Examiner* — Rafferty Kelly
(74) *Attorney, Agent, or Firm* — Hasse & Nesbitt LLC; Daniel F. Nesbitt

(57) ABSTRACT

An electronic voting method and system implemented in a portable device (1) that improves voting transparency and speed, encouraging participation in the voting process, comprised of registering an identifier code of the portable device (1) used by the voter to vote, associating said identifier to the voter's identity; selecting a Code A by the voter from a first plurality of random codes (20a) received in the portable device (1) and a Code B from a second plurality of random codes (20b) received in the portable device (1); casting the vote in a voting interface (30a) associating it with the random code B selected by the voter, where said association is called voting set (10b); issuing the identifier of the portable device in an identifier interface (40a) associating it with random code A selected by the voter, where said association is called identifier set (10a); sending via a network (5) to the at least one server (6) the voting information that is comprised of at least two separate batches of information, where at least a first separate batch of information (30b) is comprised of the voting set (10b), and at least a second separate batch of information (40b) is comprised of the identifier set (10a); receiving the separate batches of information in the at least one server (6) that is in charge of processing and registering at random the information contained in each batch; and printing in at least one printing device (8) the separate batches of information received in the at least one server (6), where printing of the separate batches of information is generated at random, thus making the association among the different voting papers impossible, leaving a paper trail (8a, 8b) that acts as back-up for the electronic voting.

52 Claims, 6 Drawing Sheets

(56) References Cited

U.S. PATENT DOCUMENTS

| | | | |
|---|---|---|---|
| 2007/0185761 A1* | 8/2007 | Mori | G07C 13/00 705/12 |
| 2008/0105742 A1 | 5/2008 | Kim et al. | |
| 2011/0238463 A1 | 9/2011 | Marchal | |
| 2012/0095811 A1 | 4/2012 | Tagawa | |
| 2014/0089062 A1 | 3/2014 | Chen | |
| 2014/0207537 A1 | 7/2014 | Joyce et al. | |

* cited by examiner

METHOD AND SYSTEM OF ELECTRONIC VOTING IMPLEMENTED IN A PORTABLE DEVICE

The present application relates to a method and system for electronic voting capable of being implemented in portable devices, such as smartphones, meeting the basic requirements of anonymity, verifiability and security in voting, as well as other well known requirements for electronic voting systems. It should be noted that the method and system proposed in the application meet the six requirements set in the assessment dimensions for voting systems and methods. The dilemma of allowing voters to verify the correct issue and vote counting while ensuring anonymity is resolved, as well as preventing the risks associated with malicious third parties, fraud, failure or errors in computer systems, thus giving the transparency needed to encourage participation and ensure the integrity of the voting results.

Furthermore, the invention of the present application improves voting rates by providing a method and system implemented in portable devices, which are currently widely used, allowing the vote to be cast remotely without going to a determined polling place, ensuring voting is secure for both the process itself and to the voter.

BACKGROUND OF THE INVENTION

The methods and systems for electronic voting have begun to be widely used in various instances, both in particular votes, such as those including analysis of trends and opinion polls, and large popular votes, e.g. related to elections of public office or referendums.

Indeed, the early history of massive implementation of electronic voting dates back to 1964, with the United States being one of the pioneers in implementing such a system. At that time, electronic voting systems were installed directly in the polling stations, using punch cards and counting computer machines. Such devices have evolved over time in order to comply with the requirements of security, anonymity and transparency, as well as to improve the administration and counting of mass votes thanks to automation.

In 1996 the US government implemented the first election in which various voting mechanisms were offered, including Internet, mail and telephone voting. However, the first parliamentary election offering voting capacity by Internet was conducted in Estonia, in 2007, where the voter used a smart identification card as authentication agent. At that time, the objective was to make the voting process easier releasing the polling place at voter's choice; about 4% of votes was cast by accessing the Internet. Advanced examples of such electronic voting systems are found in US patent applications 2011/0238463 and US 2012/0095811, where electronic voting systems and methods are proposed that integrate various mechanisms for voter identification, management of voting and counting of votes cast, in addition to security mechanisms to authenticate the vote and results.

In this respect, during parliamentary votes in Europe in 2011, the highest percentage of Internet voting was obtained, with 24% of total votes. This high percentage was attributable to the provision of mobile phones as voter identification equipment, as proposed in the patent application US 2014/0207537, a document that also considered portable computers as an interface comprising the ballot.

Considering the above background, the patent application US 2002/0077886 discloses a system, a method and apparatus for electronic voting that is installed in the polling place, wherein said apparatus provides independent systems for recording and counting, and printing the ballot papers issued. In this context, the apparatus provides separate storage means for storing redundant voting information, with the storage of, at the very least, voting information in electronic memories, used by the system for counting, as well as information on paper voting, usually used to audit the voting process. Furthermore, the apparatus of the application uses a display device in which an interface is implemented for the voter that provides a voting session identifier. This provides transparency in every vote and maintains anonymity between each vote and the voter. However, the method, system and apparatus of the application consider printing the votes with identification codes assigned to the user, which facilitates the association of a vote with the applicable voter. Moreover, the voting machines are installed in polling places; thus, remote secure voting is not possible. Therefore, the solution proposed by the application US 2002/0077886 does not address issues related to remote voting or how to facilitate voting so as to stimulate the number of votes; in addition, it has serious security problems associated with voting, mainly anonymity and non-coercion. These problems result from the random printing of the code in the voting paper, thus allowing for the possibility of associating the code with the voter and, therefore, associate the voter with the vote cast.

Moreover, the publication of patent application WO 2012/137035 defines the use of GMS networks for a mobile voting system based on nationwide location, where the GMS network is used to access all citizens of a region and to provide real-time connection to a central database platform. This central database collects the online votes, counting those votes securely, taking into consideration the voter's anonymity by avoiding the storage of information associated with their identity, and providing the possibility of accessing the system for audit. In short, the system proposed by the publication is to use the GMS network to collect the votes of the voters and to obtain their location. While this solution allows releasing the voter from the polling place, it does not ensure the protection of the vote and the voter with respect to the main requirements or pillars where electronic voting is framed. Indeed, the system proposed by the WO 2012/137035 does not include features to prevent electoral fraud, which becomes relevant in electronic systems due to the management of information and the possibility that malicious third parties, for example hackers, gain access to it.

Regarding the above, it is identified that security in electronic voting systems is of high relevance. In this regard, the document JP 2011028376 provides an electronic voting system using cell phones, with the system comprised of a server arranged in a network and cellular phones; each phone includes an identifier corresponding to the IMSI number associated with the device's SIM card. Said system comprises various programs to cast a vote, including a program preventing double vote in the same cell phone through the identification of the identifier. In this context, the document in question only takes care of voting security with respect to doubling the vote, without proposing security mechanisms that may avoid, among other things, electoral fraud by malicious third parties. Moreover, users with multiple SIM cards may attempt to violate the security of the system by introducing such cards in the device used for voting.

In addition, the document EP 2455919 describes an electronic voting method that uses a mobile communications network. This method considers various security mechanisms, among which a PIN number known by the voter is sent to the authority in charge of the election to verify and authorize the electronic voting of said voter. Such approval takes place with a code received by the voter, who also receives information to vote. A random number is generated by a trusted authority and sent to the voter, so that the encrypted voting information and the random number are sent to the authority in charge of the election process. Considering the above, the document EP 2455919 proposes a complex security system that increases the voting security but it is not able to prevent malicious third parties accessing the information found online and handle or disclose it without authorization. Indeed, the single method of protection against third party access is encryption of information, a methodology that is currently vulnerable because of the great capabilities computers have in processing information, which allows the deciphering of even the most advanced encryptions. In addition, the voting verification system is cumbersome and complex, increasing the chances of failure during operation. Regarding anonymity, the document EP 2455919 states that this requirement is achieved by associating the vote with an encrypted random number and not with the information of the voter; however, this association prevents voters from verifying themselves the cast vote.

The document patent application US 2014/0089062 provides a voting system that uses smartphones, indicating that this provides a safe and quick method to vote. In this regard, this document uses different modules including a certificate management module and a module for managing aspects of voting, such as management of voter information, voter registration and identity, generation and verification of voting certificate, among others. In this context, the system and method proposed by this document considers the constant communication between the voter and a server that verifies the identity of the voter and, after verification, it issues a voting certificate authorizing the vote. In addition, the secret voting system proposed in the document US 2014/0089062 is comprised of a series of steps and involves various modules which complicate voting, making it unfriendly for the voter. Finally, the system and method proposed in the document does not propose a simple and effective solution to prevent voter fraud by malicious third parties, since the only barrier facing such fraud is encryption of information, which is not secure when validating a vote. Ii addition, secrecy in voting is only insured by the certification of the voter registration, which—added to the non-verifiability of the method of the vote—increases the uncertainty of the system.

In this context, many systems use similar methodologies to those described in US 2014/0089062, such as US 2008/0105742 and US 2005/101307 documents in which identification mechanisms are used as comparison between transaction identifiers and identification and encryption as a primary means of security against fraud. Indeed, most of the solutions that propose the use of portable devices, such as smart phones as a means of voting, take over security aspects related to voting secrecy and anonymity of the voter, without addressing other risks associated with voting, such as verifiability and non-coercion, among others that are discussed below.

Although it has been shown that electronic voting systems have been used for several years, these systems are not free from errors that can lead to invalidate an election. Among these errors, the most relevant ones relate to the authentication of the voter, the registration of voter preferences by voting intention, the counting of preferences and security in the sense that data are not altered, being these some of the pillars that a voting system must ensure. Moreover, more complex voting systems have the disadvantage of relying on the operation of elements of such systems, such as identification devices by fingerprint and network capabilities, among others.

As already indicated, the alteration of the electronic voting records from malicious third parties, fraud, failure or errors in computer systems is a risk inherent in the use of electronic systems, primarily due to the possibility that such events will not be detectable when the methods and systems prevent voting traceability in order to protect anonymity. Furthermore, methods and systems that maintain traceability of the vote to detect such events do not guarantee anonymity. In this respect, a relevant problem to be solved by electronic voting systems is to maintain the anonymity of the voter, preventing a particular vote to be traced to a voter, while allowing verifiability, and detection of attempts on security from malicious third parties, fraud, failures or errors in computer systems in order to ensure voting integrity is not compromised.

In this context, experts have reached consensus that a method and system for electronic voting should be evaluated on the basis of six dimensions, which also apply to traditional voting systems. Here, the requirements established relate to:

Ensuring the legitimacy of the vote,
Preventing coercion (non-coercion)
Capturing the voter's intention,
Safeguarding of voter's privacy (anonymity),
Security and transparency of the voting system, and
Verifiability of the cast votes.

These requirements are necessary to achieve the objective of proposing a secure voting system both for the process itself and for the voter. In this respect, in an electronic voting system, the requirement for verifiability has replaced the supervision of vote counting used in traditional voting processes by allowing each voter to verify whether their vote was properly considered, but taking into account that this could facilitate bribery if the process allows a third party to also verify the vote of each voter.

Despite the facilities provided by an electronic voting method and system, there is a cultural barrier to the use of such systems, which results in relatively low percentages compared to traditional voting. In this context, the main barrier refers to the voters' distrust of voting in electronic devices at the time of voting, due to the fact that involvement in the process and/or performance is unrelated to the user.

Regarding the above, today the use of personal high-performance portable devices such as smartphones, has increased considerably, with those devices being part of the daily lives of users. Indeed, today's portable devices offer users multiple features, including Internet access, online banking, handling emails and storing personal information, where such features often involve sensitive user information. In this sense, safe handling of sensitive or critical information on mobile portable devices has been the object of major developments; thus, at present there are security systems that greatly reduce the possibility of critical information leakage, achieving acceptable safety levels, as those associated with the use of smart cards for authentication purposes. However, considering the flexibilities in the electronic environment, the risk will always exist that malicious third parties may overcome the security systems, thus gaining access to alter sensitive or critical information, which can be countered by providing voter verifiability and ensuring its anonymity.

It is therefore necessary to implement an electronic voting system and method able to simultaneously meet the six dimensions previously stated, while encouraging use by implementing a reliable and familiar interface for the voter, wherein said voter can verify the correct issue and vote counting, safeguarding the privacy of the voter, and containing the risk associated with malicious third parties, fraud, failure or errors in computer systems.

BRIEF DESCRIPTION OF THE INVENTION

The present invention comprises an electronic voting method that allows voting through a network such as Internet or Intranet using portable devices, such as smartphones, capable of data transmission. An objective of the invention is to solve the problem of allowing voters to verify their vote was properly considered in the count, and avoiding the risk of disclosing the identity of the voter, i.e. ensuring their anonymity and preventing the risks associated with malicious third parties, fraud, failure or errors in computer systems. This, in combination with the high safety standards of current portable devices and the user experience offered by these devices, enables a transparent, quick method and a system that encourages the participation of portable device users.

In this context, the first stage or step of the electronic voting system and method proposed in the application is having voters duly registered in a database. The registration of voters is an essential component of the invention, widely used in all kinds of voting, whether electronic or not. In this respect, the method and system of the present invention first requires voters to be registered as such in a database, where such registration is done by associating the identity of the voter with a portable device identifier to be used by the voter when voting, with such identifier being, in the case of smartphones and cell phones, the International Mobile Equipment identifier associated with each mobile device, known as IMEI. The identifier is a unique electronic universal code that differentiates a portable device from another, even if they correspond to the same model.

Additionally, the method and system of the invention allow only a single identifier or portable device IMEI to be associated per voter, having the same number of voters as portable electronic devices registered to vote.

As a result, a database of registered voters is obtained and associated with the portable device identifier or IMEI to be used in the voting, all of them being potential voters by the method and system proposed by the invention.

Once the voter is registered or the universe of registered voters has been established for an electronic vote according to the method and system proposed in this application, the voting process can start, where each voter can cast their vote, for example through internet or intranet, from the portable device registered, with voting information received by at least one polling server in at least two separate sets or batches of information. Each separate set or batch of information is comprised of different data, preventing the association between the at least two batches of information since they are separate from each other, thereby preventing the disclosure of the voter identity to preclude the association of a specific vote with the identifier of the portable device or IMEI of the device registered where such vote was cast. In this sense, at least a first separate batch of information, called identifier set, is comprised of the identifier of the portable device or IMEI as obtained from the portable device that was used to vote, which must be registered through said identifier for the vote to be processed by at least one polling server, and a code A selected by the voter to cast the vote in its portable device, wherein said code A is selected from a plurality of codes randomly generated and already predefined to allow authentication of the portable device identifier or IMEI with the information provided by the voter through a code module. The IMEI or identifier or portable device with the code A provides confirmation that all votes cast come from voters registered in the database and verifies that there is no duplication of votes. This code A, which is only known by the voter at the time of its selection, as well as the identifier of the portable device or IMEI, allows the voter to verify that their participation was recorded properly once the results are published on the Internet and/or Intranet, with IMEIs being referenced to code A selected by each voter.

Moreover, at the very least a second separate batch of information, called set of voting, is comprised of the vote cast and a code B different from code A, also selected by the voter when casting the vote on their portable device, wherein said code B is selected from a plurality of codes randomly generated and already predefined by a code module to allow authentication of votes. This code, which is only known by the voter at the time of its selection, allows the voter to verify that their vote was counted correctly, once the results are published on the Internet and/or Intranet, with all votes cast being referenced to the code B chosen by each voter.

The plurality of randomly generated codes is predefined and equal for all voters comprised of a number of permutations that make it almost impossible for two voters to select the same code for the same voting. For example, for a group of voters grouped in a virtual polling station of 400 voters, where they must select from 9-digit numeric codes, there is less than 0.01% probability to choose the same code. When the system operates in online mode, the plurality of codes can be generated for each new group of voters (i.e. 400 voters) excluding those codes already used in the voting (i.e. by any of the 400 voters), before being sent to the new voter for its selection and subsequent authentication. In this way, the possibility of two voters, from the group of 400 voters, selecting the same code for the same voting is eliminated.

As part of the methodology and system implemented, the separate batches of information, the voting set and the identifier set are received by the voting server and randomly arranged, so that they cannot be associated on the basis of the sequence in which they were received by the voting server. Printing of separate batches of information is generated randomly by the voting server and/or by a printing device that randomly compiles said information, making the association between different paper traces of the voting impossible. For the voting set, the polling server begins random printing only once a first vote is recorded that expresses a different preference to the previously recorded votes, so that the first votes that express the same preference cannot be associated with voters; for example, if 10 sets of voting have been received and number 11 is the first to include a vote that is different from the previous opinions, it is only from vote number 11 when random print of sets of vote starts. In the case of the printing device, the random compilation is achieved when the output of prints is received in a receptacle that does not allow maintaining the print sequence.

Thus, finally, as part of the methodology and system implemented, results are verified. In this sense, once the results are published on the Internet and/or Intranet, the voter may query using codes A and B previously selected to confirm their vote and participation were correctly recorded. In this context, according to one embodiment of the invention the voter sends their confirmation or verification from their portable device, with the verification information being received by the voting server, wherein the verification information is called verification set. The verification set includes the verification and the identifier of the portable device or IMEI that is obtained from the portable device used to complete the verification, which must be the same as the device used to vote that has already been registered in order to allow authentication of the verification with the ID of the portable device or IMEI. In addition, the printouts of the votes, identifier set and verification set, leave a paper trail that acts as a backup to the electronic voting, which can also be used to verify the validity of the results; vote counts, participation counts and verification counts by the voting server, for example, in audits performed to the process or by public scrutiny.

All temporary files that the system may have created during the voting process, containing information that allows association of the voter with the vote, for example the set of voting and ID group, are deleted to prevent third party accessing them.

Considering the above, it is possible to determine that the methodology and system proposed in the application allow at the least:

Safeguarding the voter anonymity, by preventing the association of the voter to the vote cast, Verification for voters that their vote was properly considered and counted, as votes are made public along with the code associated with that vote, which is chosen and known only by that voter, The prevention of attempted fraud by malicious third parties, as well as failure or errors in computer systems, by being able to trace the vote and the voter participation in the election with information given by the voter; by codes A and B predefined and authenticated, which are independent from the operation of the electronic voting system, and by the paper back-up which should match the electronic voting results that are also published on the Internet and/or Intranet.

The table below shows the qualities of the method and system for the six dimensions established to evaluate voting systems and methods, particularly for electronic voting.

TABLE 1

Dimensions of evaluation methods and voting systems

| Dimension | Requirement | Characteristic of the method and system proposed |
|---|---|---|
| Vote legitimacy | Only legitimized voters can cast their vote. Each voter may cast only one vote in each election. | Only the identifier of the portable device registered by the voter is entitled to cast one single vote by the method and system of the invention. Voters select a code A from a plurality of randomly generated codes as they cast their vote in the portable device where said code A is associated with the identifier or IMEI obtained from the portable device (identifier set) allowing authentication of the origin of the identifier of the portable device with information provided by the voter and not only by the system. Voters select a code B from a plurality of randomly generated codes different from code A as they cast their vote in the portable device where said code B is associated with the vote (voting set) allowing authentication of the origin of the vote with information provided by the voter and not only by the system. Random codes are predefined by a code module to allow the server authenticate the vote. |
| Verifiability | Each voter must be able to verify the validity of the vote cast. Voters must be authorized to verify that their vote was properly counted. The results of the election must be verifiable by the public, being this requirement a way to ensure that the process has been performed in the right way. | The user or voter verifies their vote and participation in the voting process, once the results are published on the Internet and/or Intranet, using codes A and B selected, which are independent of the electronic voting system operation. Prints of the voting set, identifier set and verification set leave a paper trail that acts as a backup to the electronic voting, which can also be used to verify the validity of the results; count of votes, count of participation and count of verification by the voting server, for example, in audits performed to the process or by public scrutiny |
| Anonymity | For an anonymous electronic election to be achieved, only the voter can know their vote in the voting process. The protection of private information is one of the most important requirements of electronic voting. | Only the voter knows the codes A and B selected and generated randomly. The voter does not receive an official record or print of the portable device identifier or IMEI with code A selected (set of identifiers) or vote and code B selected (voting set) that could compromise anonymity. Separate batches of information, voting set and identifier set are received and sorted randomly by the voting server, so that they cannot be associated based on the sequence in which |

TABLE 1-continued

Dimensions of evaluation methods and voting systems

| Dimension | Requirement | Characteristic of the method and system proposed |
|---|---|---|
| | | they were received by the voting server. Printing of separate batches of information is generated randomly by the voting server and/or by a printing device that compiles them randomly, making the association between different paper trails of the vote impossible. For the voting set, the polling server starts the random printing only once a first vote expressing a different preference to the votes previously recorded is received, so that the first votes that express the same preference cannot be associated with voters. All temporary files that the system may have created during the voting process, containing information that allows the association of the voter with a vote, for example the voting set and the identifier set, are deleted to prevent a third party from having access to them. |
| Non Coercion | Each voter should be able to cast their vote according to their own decision, i.e., no voter can be forced to vote in a particular way. | Voting takes place in the privacy chosen by each voter using the portable device registered or in the privacy determined by the appropriate authority; thus, voting premises are established where access to the voting system can be controlled and only given through an Intranet network available on these premises. The codes are generated randomly (code A and code B) and they can be chosen only at the time the vote is issued, preventing voters from being coerced to compromise their vote. The voter does not receive an official record or print of their vote or codes, therefore when these are made public on the Internet and/or Intranet, the voter may not be assigned authorship of a particular voter All temporary files that the system may have created during the voting process, containing information that allows association of the voter with a vote, for example the voting set and the identifier set, are deleted to prevent a third party from having access to them. |
| Voting intention | The voting process should be as simple as possible for the voter so to ensure that the vote cast is consistent with the vote intent. A friendly electronic voting interface is preferred, not requiring the learning of sophisticated techniques or the use of additional equipment. | The voter uses its own portable device, wherein the method of voting is implemented. Before completing the vote, this is confirmed by the voter as part of the selection process of codes. This gives the voter another opportunity to reflect their intended selection. |
| Security and transparency | A secure electronic voting system should prevent the vote count from being altered, duplicated or removed by third parties. Every legitimate vote should be counted correctly. The possibility for an illegitimate vote to be considered is completely eliminated. The alteration of electronic records by malicious parties, fraud, failure or errors in computer systems should become clear, preventing any negative impact on the integrity of the process. | The security of the method and system proposed employs cutting edge security technology for portable devices, communication and servers, helping prevent the vote from being altered, duplicated or removed by someone and enabling the correct counting of legitimate votes. However, in case of alteration of electronic records by malicious parties, fraud, failure or errors in computer systems, the verifiability of votes by voters with the predefined A and B codes-randomly generated but selected by the voter-provides an independent means to identify problems in the integrity of the process, thus ensuring the accuracy of the method and system proposed. Prints of the voting set, the identifier set and the verification set leave a paper trail that acts as a backup to the electronic voting that can also be used to reveal whether the results of the vote have been altered, as well as the vote |

TABLE 1-continued

Dimensions of evaluation methods and voting systems

| Dimension | Requirement | Characteristic of the method and system proposed |
|---|---|---|
| | | count, participation count and verification count by the voting server, for example, in audits performed to the process or by public scrutiny. |

Considering the above, it follows that the method proposed in the application is an electronic voting method implemented in portable devices, which improves transparency and speed in voting, and encourages participation therein. In its general aspects, said method is comprised of the following steps:

Registering the identifier of the portable device used by the voter in casting their vote, and associating said identifier with the identity of the voter.
  The voter registration with the identifier of the portable device consists of storing the identifier of the portable device along with the voter identification in a database.
  The identifier of the portable device must correspond to the IMET of the device.
Start the voting process where the portable device used by the voter is authenticated when establishing the connection by comparing the identifier of the portable device registered with the ID obtained from the portable device.
  The identification and verification module, which manages the identification interface, can be implemented on the portable device.
Generate the vote by the voter in the portable device registered.
  The vote includes the choice made by the voter.
  The vote may be multiple in the case of several elections, for instance candidates or questions to be answered, to which the elector is subject.
  The vote may include one or more texts written by the voter stating a position or opinion.
  The vote is generated at a voting interface proposed by a voting module.
  The voting module can be implemented in the portable device.
Select—by the voter—at least two of a plurality of random codes received in the portable device.
  Before voting, a plurality of random codes is received in the portable device, wherein said codes are predefined or generated by a module of codes.
  The module of codes can be implemented in the portable device.
Issue the vote at the polling interface, associating it with at least one B random code selected by the voter.
Issue participation at the identification interface, associating it with at least one code A randomly selected by the voter, which must be different from code B.
Send at least to one voting server the voting information comprising at least two separate batches of information, wherein:
  At least a first separate batch of information comprising the vote and at least one code B randomly selected by the voter, and
  At least a second separate batch of information including the identifier obtained from the portable device used in the casting of votes and at least one code A randomly selected by the voter, which must be different from code B.
  The separate batches of information are not associable with each other, preventing the vote and random code B, generated by the voting module, and the identifier obtained from the portable device and random code A, generated from an identification and verification module, from being associated.
  The voting module, as already indicated, can be implemented in the portable device.
  The identification and verification module, which manages the identification interface, can be implemented in the portable device.
Receive the separate batches of information in at least one polling server, responsible for processing the information contained in each batch.
  First, the voting server authenticates the votes cast confirming that the random code B belongs to one of the predefined codes, and processes the vote count.
  In addition, the voting server verifies that the identifiers obtained from the portable devices that have issued votes are duly registered in the database, confirming that the random code A belongs to one of the predefined codes, and processes the voter participation.
  The separate batches of information are sorted randomly by the voting server, making impossible the association among different batches by the sequence in which they are received by the voting server.
Print in at least one printing device, the separate batches of information received in the voting server, leaving a paper trail that acts as support for the electronic voting.
  Printing of separate batches of information is generated randomly by the voting server and/or randomly compiled by the printing device, making the association between different paper trails of the vote impossible.
Furthermore, an embodiment of the invention may comprise the step of:
  Verification, by the voter, that its vote and participation were properly recorded once the results are published on the Internet and/or Intranet.
    Once the results are published on the Internet and/or Intranet, the polling server notifies the voter, for example through email, to consult on the Internet and/or Intranet, using codes A and B previously selected, if their vote and participation were correctly recorded.

The voter issues their verification at the verification interface.

The verification information that includes the verification and the identifier obtained from the portable device used is sent to at least one polling server.

At least one polling server receives the verification information, and is responsible for processing the information. The polling server authenticates the verifications issued, confirming that the identifiers obtained from the portable devices that have issued verification are properly registered in the database, and processes the verification counting.

Print in at least one printing device, the batch of verification information, leaving a paper trail that acts as support for electronic voting.

The verification interface may be implemented in the identification and verification module, or in a separate module.

The identification and verification module, as already indicated, can be implemented in the portable device.

As you may notice, the method described above is implemented in a system associated with that method, wherein said system is comprised of:

A portable device for each voter;

At least one database for recording and storing of identifiers of portable devices associated with the identity of voters and other data relating to the voting process, developed in accordance with the requirements of the authority responsible for the vote, which may be comprised of, but is not limited to, data of candidates, data of the positions for which they are running, data of questions to be voted on, data of the voter registry, data of the clustering of voters by sector or station, etc.

At least one module of codes in which a plurality of codes are randomly generated for each batch;

The module of codes can be implemented in the portable device.

The module of codes can obtain the plurality of random codes from a database of codes.

At least one voting module where the information on voting and random code B is entered as selected by the voter;

The voting module can be implemented in the portable device.

At least one identification and verification module that gets the identifier from the portable device, wherein the random code A is entered as selected by the voter and the verification information;

The identification and verification module can be implemented in the portable device.

At least one polling server that coordinates voting and receives the separate batches of information issued from the portable device and orders them randomly and where printing of separate batches of information is generated randomly, thus making the association among different paper trails of voting impossible.

At least one printing device wherein the printing of separate batches of information is compiled randomly, making the association among different paper trails of voting impossible.

Considering the above, it is noted that the method and system proposed in the application meets the requirements of the six dimensions of assessment established for voting systems and methods, solving the problem of allowing voters to verify the right cast and count of their vote, avoiding the risk of disclosing the identity of the voter, i.e. ensuring their anonymity and providing the transparency required to prevent the realization of possible malicious attempts, fraud, failure or errors in computer systems. In addition, thanks to the high levels of security of current portable devices and the user experience offered by these devices, the proposed solution allows a quick, participation-encouraging voting system and method.

BRIEF DESCRIPTION OF THE FIGURES

As part of the present application the following representative figures of the invention are presented, which teach preferred embodiments thereof and, therefore, should not be construed as limiting the definition of the application.

DESCRIPTION OF THE PREFERRED EMBODIMENT

Figure 1:
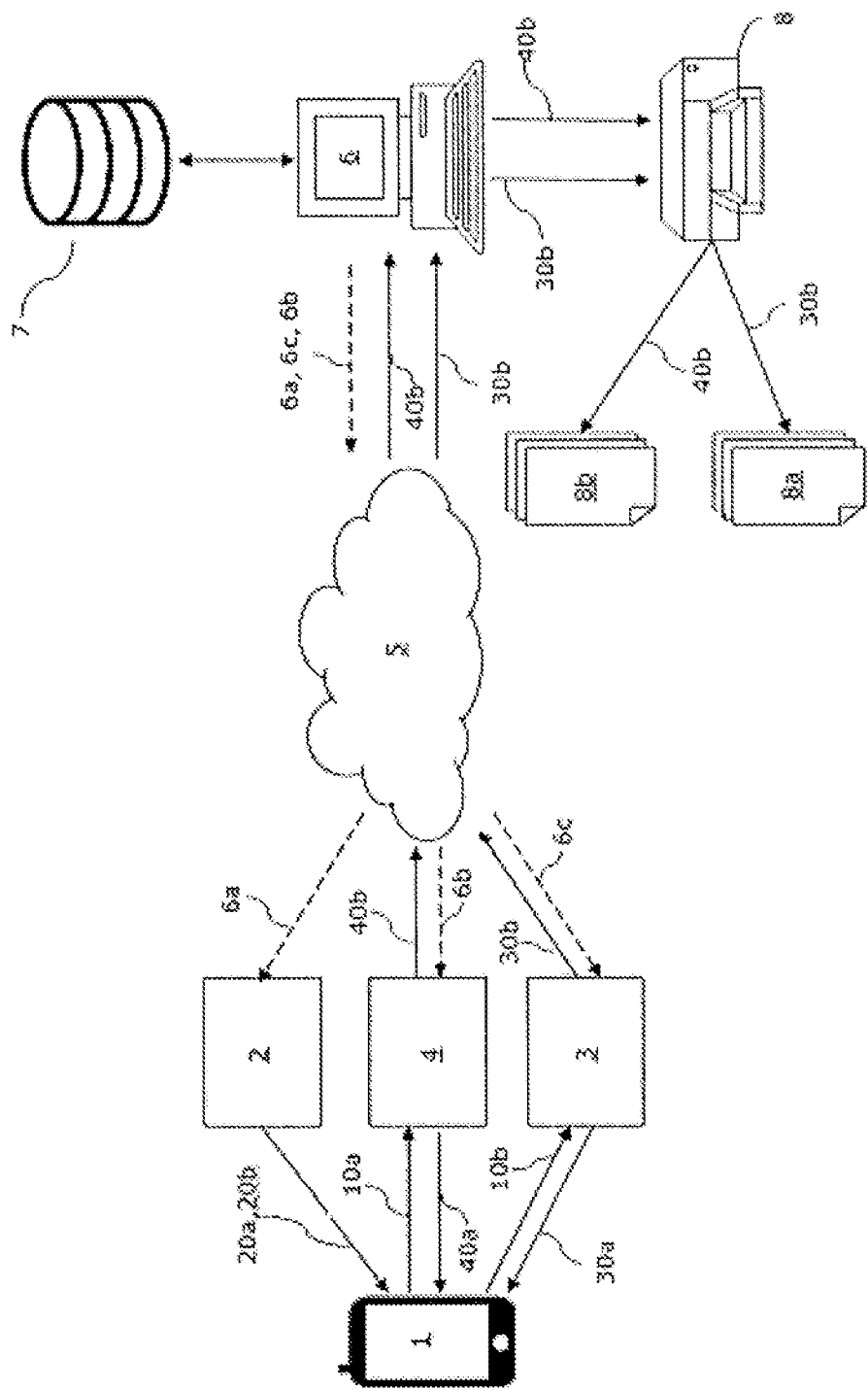
FIG. 1 shows a scheme of the system according to an embodiment of the invention wherein the system operates in on-line mode.

FIG. 1 shows a scheme of an embodiment of an electronic voting system proposed by the application, wherein the system operates in on-line mode, that is, in direct and instant communication through a network. In this scheme, a portable device 1 is shown, which is in communication with at least one code module 2, at least one module of identification and verification 4 and at least one voting module 3. Communication between the modules and the portable device 1 is such that:

The at least one identification and verification module 4 is comprised of an identifier code of the portable device 1, which is previously stored in the module and is verified with the ID code contained in the portable device 1, for establishing the communication.

This module via an interface of identifier 40a receives a set of identifier 10a comprised of the identifier code obtained from the portable device 1 associated with the random code A that the voter has selected as part of the voting process.

Figure 2:
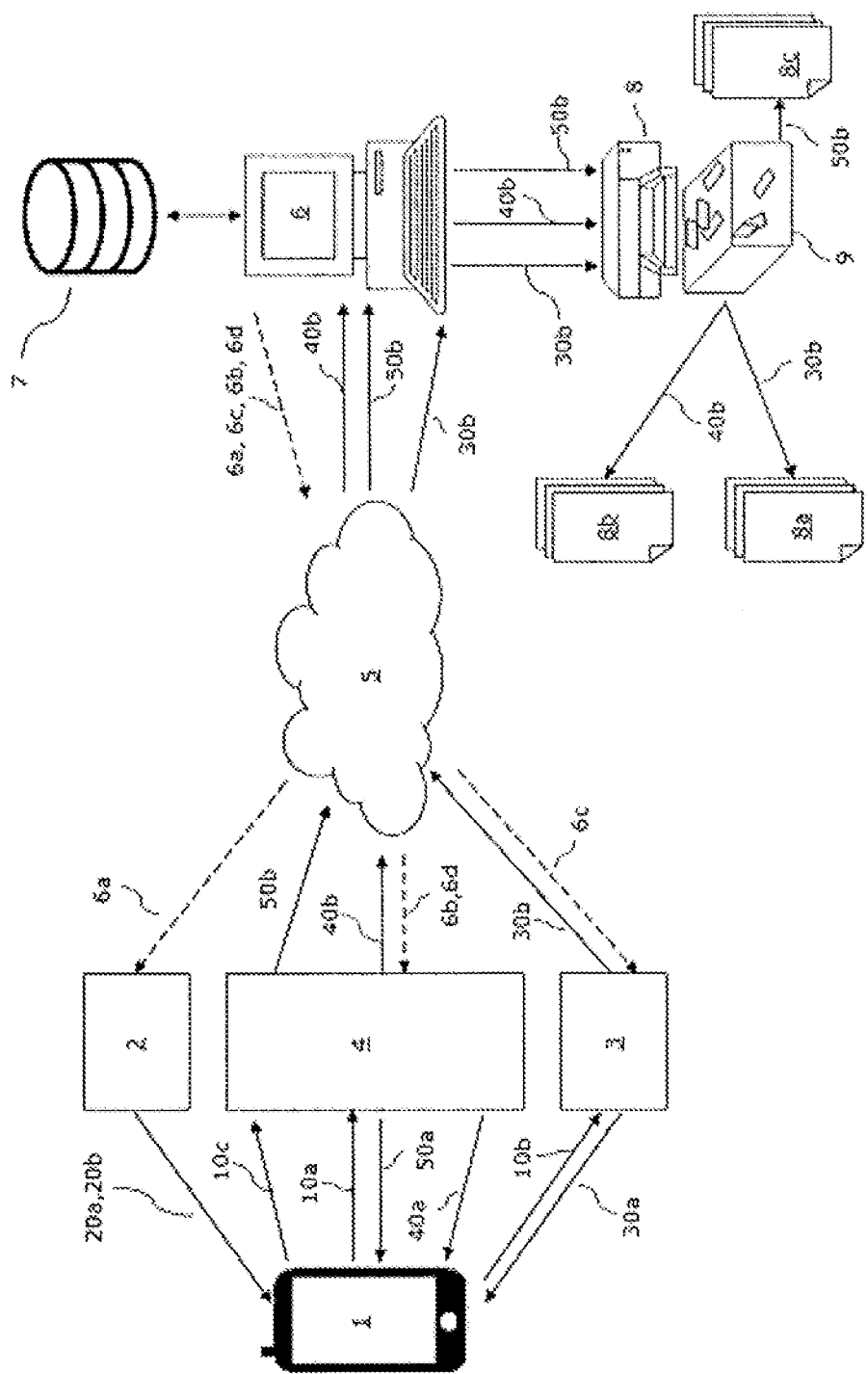
FIG. 2 shows a scheme of the system according to an embodiment of the invention including the verification process as part of the system, wherein the system operates in on-line mode.

In an alternative embodiment shown in FIG. 2, this module via an interface check 50a receives a set of verification 10c comprised of the identifier code obtained from the portable device 1 together with verification of the voter.

The at least one code module 2 sends to the portable device 1 a first and second plurality of random codes 20a and 20b, respectively, which must be different from each other and which have been generated in the module of codes 2 and from which the voter will select at least one of each, code A and code B. The random codes may be comprised of numeric, alphanumeric and/or image codes.

In one embodiment, the first plurality of random codes 20*a* is displayed on the screen of device 1, before generating the vote but after communication is established, so that the voter may select code A, which will be associated with the identifier code obtained from the portable device 1 creating the identifier set 10*a*, and then again a second plurality of random codes 20*b* is displayed on the screen of device 1 after generating the vote, for the voter to select a code B, where code B will be associated with the vote, thus creating the voting set 10*b*.

In a second embodiment, the first and second plurality of random codes 20*a* and 20*b*, respectively, is displayed on the screen of device 1 after generating the vote, for the voter to select code A, which will be associated with the identifier code obtained from portable device 1 creating the identifier set 10*a*, and the code B to be associated with the vote, creating the voting set 10*b*.

The at least one voting module 3 allows a voting interface 30*a* to be displayed in the portable device. After the vote, said module receives the voting set 10*b* comprised of the vote cast, which can be a written text, by the voter associated with the random code B that said voter selected, which is different from the code A that is associated with the identifier code obtained from portable device 1 according to the above.

Additionally, in one embodiment of the invention, modules 2, 3 and 4 are implemented in a single voting management module, which can be in turn implemented in the portable device 1 or, at least, in a polling server 6. Here, one embodiment of the invention contemplates that each module can be implemented separately in the portable device 1 or in, at the least a polling server 6. In addition, each module mentioned corresponds to a computer program responsible for carrying out the actions associated with each module.

Moreover, FIG. 1 shows that the identification and verification module 4 and voting module 3 sends at the least, two separate batches of information 30*b* and 40*b* to a network 5, where at the least a first separate batch of information 30*b* includes the voting set 10*b*, while at least a second separate batch of information 40*b* includes the identifier set 10*a* of portable device 1. In this context, it is worth noting that the network 5 can be any network that allows data transfer through portable devices such as type networks 2G and subsequent generation, or Intranet or Internet connections, such as wireless communication technologies. In an alternative embodiment, shown in FIG. 2, at least three separate batches of information are implemented, wherein at least one separate batch of information 50*b* is comprised of a set of verification 10*c*.

Furthermore, in an alternative embodiment of the invention, the at least one voting server 6 communicates with the portable device 1 via the network 5, sending information to said portable device. In particular, according to the present embodiment, the voting server 6 sends the plurality of random codes 6*a* to the module of codes 2, information on identifiers of registered portable devices 6*b* and alternatively as shown in FIG. 2, information on the verification interface 6*d* to the identification and verification module 4 and/or information concerning the voting interface 6*c* to the voting module 3; these embodiments are illustrated with dotted lines in FIGS. 1 and 2. Moreover, at least one polling server 6 can operate as coordinating voting unit and at the same time, as a counting, printing entity, as well as serving other functions relating to the voting process for both modes online and offline. However, alternative systems embodiments of the online and offline modes consider the use of separate servers or machines to coordinate voting, count the results and print the separate batches of information.

In the online mode shown in FIG. 1, the at least two separate batches of information 30*b* and 40*b* are instantly communicated after the user casts its vote to the at least one polling server 6 via network 5 wherein said at least one polling server 6 receives each separate batch of information and processes them separately for validation, authentication and counting, and sorts them randomly to prevent the vote and the voter from being associated with the sequence in which the batches of information are received by the voting server 6. In this context, for the first separate batch of information 30*b*, which includes the voting set 10*b*, the at least one polling server 6 authenticates that the random code B associated with the vote belongs to one of the codes of the plurality of random codes 20*b*, counting the votes correctly issued or authenticated. Additionally, the at least one polling server 6 can count the unauthenticated votes. Moreover, for the second separate batch of information 40*b*, containing the identifier set 10*a* of the portable device 1, the at least one polling server 6 validates that said identification code obtained from the portable device 1 is registered in at least one database 7 containing the record of identifiers of portable devices associated with the identity of the voter, and that the random code A associated with the identifier belongs to one of the codes of the plurality of random codes 20*a*. Additionally, the at least one polling server 6 can count the unauthenticated identifiers. Finally, according to the embodiment of the invention shown in FIG. 2 there is at least one separate batch of verification information 50*b*, which together with the at least two separate batches of information 30*b* and 40*b* forms a third separate batch of information, where said third separate batch of information 50*b* is comprised of the verification set 10*c*. In this context, the at least one voting server 6 authenticates that the identifier code obtained from the portable device 1 is registered in at least one database 7 containing the record of identifiers of portable devices associated with the voter identity, counting the authenticated verifications. Additionally, the at least one polling server 6 may count the unauthenticated verifications.

The at least one database 7 can be implemented in at least one polling server 6 or be in direct communication with the server via the network 5. Said database shall be construed as any means for storing information, whether tangible or intangible, which contains information on voting; for example, at least one database of random codes, database of candidates, database of offices to which they are running, database of questions to be voted, database of the registry of voters, database voters clusters by sector or station, etc., where said databases may be comprised of independent databases or one and the same general database. Furthermore, communication between the at least one voting server 6 and the at least one database 7 is such that the at least one polling server 6 queries and/or writes over the at least one database 7 after the voting process has started.

According to FIGS. 1 and 2, the at least one server poll 6 can randomly order the separate batches of information 30*b*, 40*b* and alternatively 50*b* for their later sending to at least one printing device 8, wherein said at least one printing device prints and randomly compiles each separate batch of information, leaving a paper trail 8*a*, 8*b* and alternatively 8*c* of voting. Said paper trail separately comprises at least one paper trail 8*a* corresponding to the first separate batch of information 30*b*, at least one second paper trail 8*6b* corresponding to the second separate batch of information 40*b* and, alternatively, a third paper trail 8*c* corresponding to the third separate batch of information 50b. Moreover, this mechanism allows backing up the electronic voting that is counted in at least one polling server 6. Alternatively, the at least one printing device 8 deposits the paper trail in at least one printing receptacle 9, as shown in FIG. 2, wherein said printing receptacle can be used in any of the embodiments of the present invention.

In one embodiment of the invention, both for online and offline operation, there are groups of printing devices, wherein said printing device groups are separately designated to print each separate batch of information.

Figure 3:
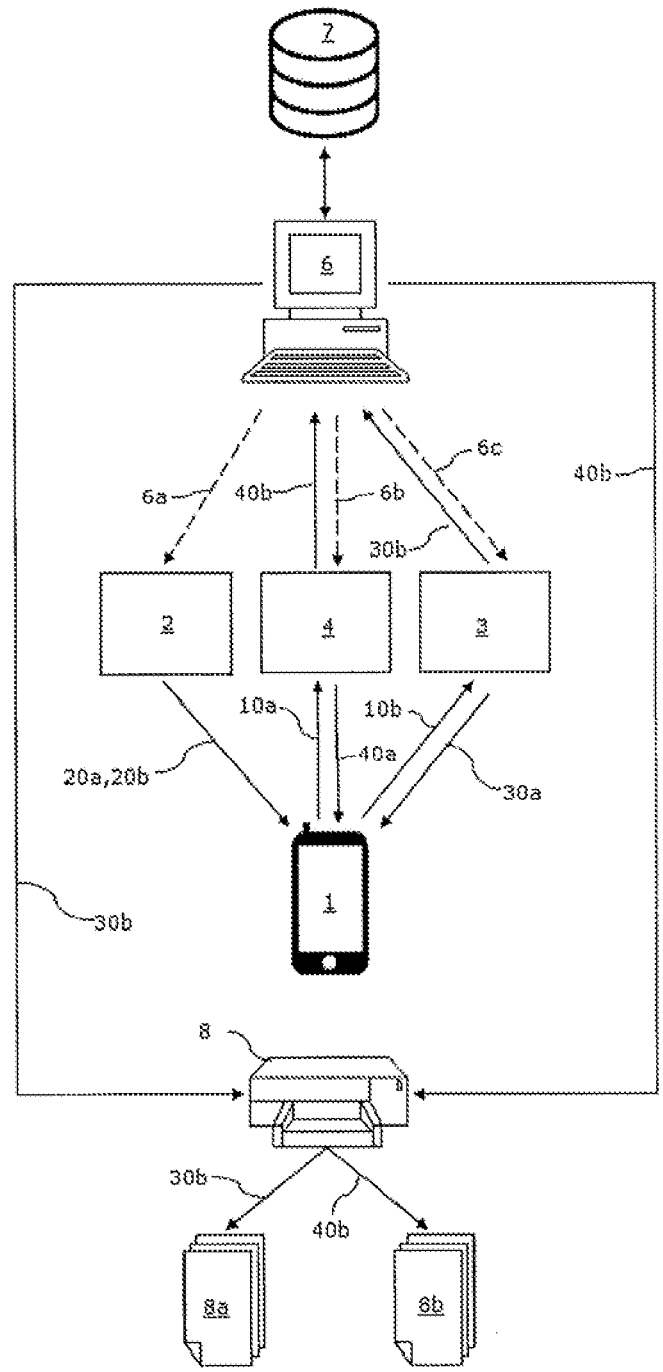
FIG. 3 shows a scheme of the system according to an embodiment of the invention wherein the system operates in an offline mode.
Figure 4:
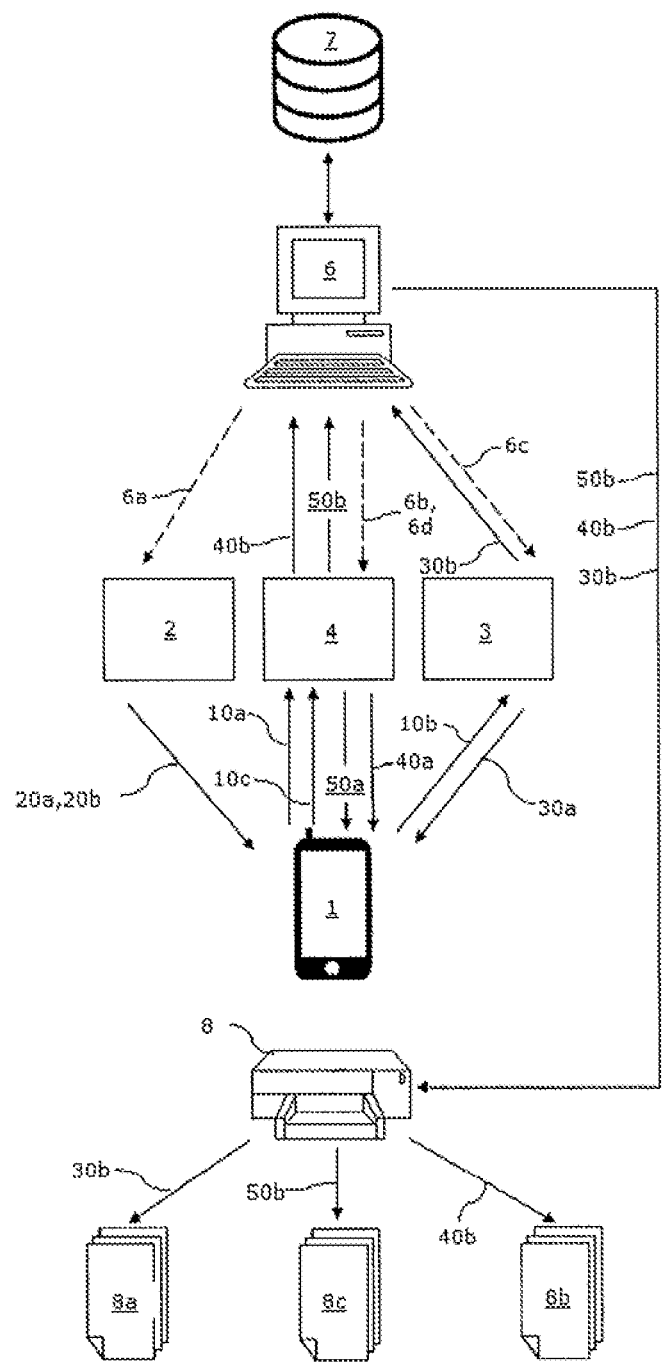
FIG. 4 shows a scheme of the system according to an embodiment of the invention including the verification process as part of the system, wherein the system operates in an offline mode.

FIG. 3 shows an embodiment of the system according to the invention operating in offline mode. Here, the main difference from the system shown in FIG. 1 is that voting is performed in the portable device 1 without being in direct and instantaneous communication with the network 5. In fact, in this embodiment of the invention, the polling server 6 communicates to the portable device 1 the information concerning voting (6a, 6b, 6c and alternatively 6d) only when the process is started, where only after the voting and verification has taken place, the portable device 1 sends separate batches information 30b, 40b and alternatively 50b to the at least one polling server 6 which can act as coordinating unit and/or counting unit. Then, both in online and offline mode, the at least one voting server 6 acting as counting unit proceeds to record the voting results electronically and, by at least one printing device 8, to print paper trails 8a, 8b and alternatively 8c corresponding to the separate batches of information 30b, 40b and 50b, respectively. Furthermore, as it can be derived from the above description, the off-line mode shown in FIG. 3 can also operate by incorporating the verification set 10c as shown in FIG. 4.

Figure 5:
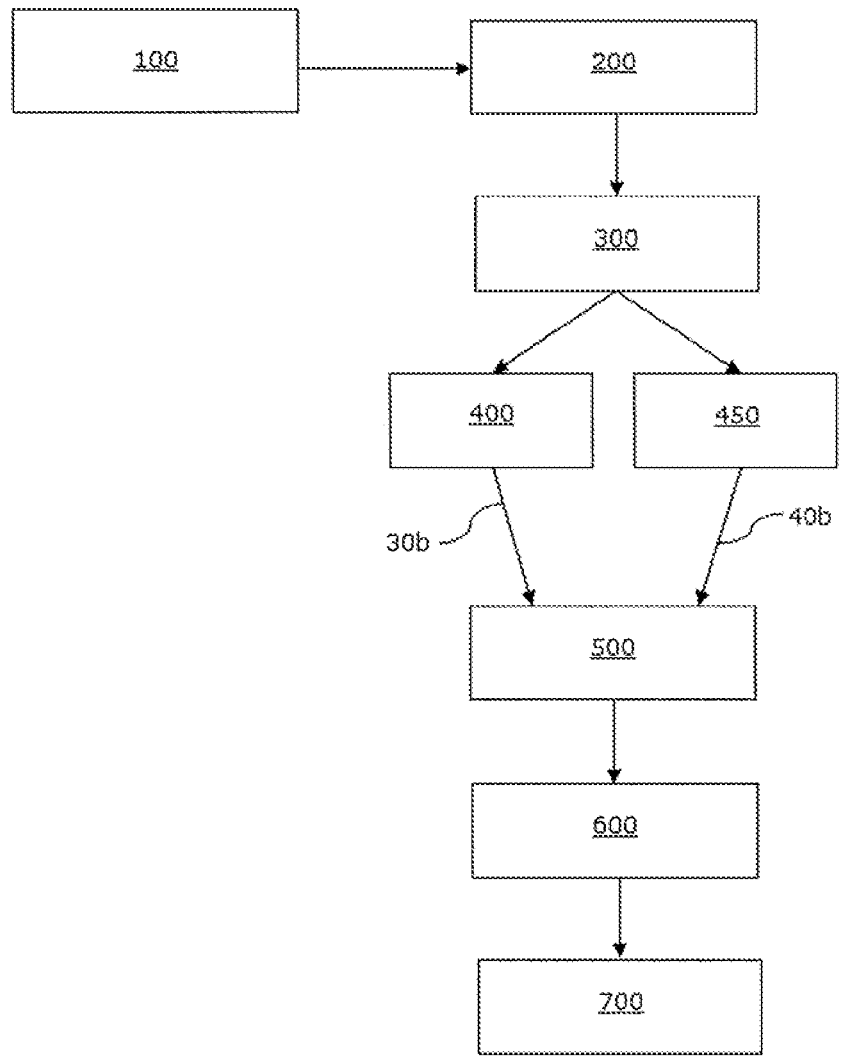
FIG. 5 shows a scheme of the method of the invention implemented in the system of FIG. 1.

FIG. 5 shows a diagram associated with the electronic voting method proposed in the application, wherein the steps of registering (100) the identifier of the portable device 1, which can be a cell phone, smartphone or any device proposed with a universal unique identifier of the IMEI type. Such registration is performed by associating the portable device identifier with the identifier of a voter, wherein said portable device identifier may correspond to the IMEI of the device. This means that the invention considers that a single portable device 1 is associated with each voter.

Once the registration is complete, the voter is authorized to use their portable device 1 in the electronic voting process. In one embodiment, the information on the registration of portable devices and voters is stored in at least one database 7 by means of at least one polling server 6 which communicates with the portable device 1.

Subsequently, the voter can generate (200) the vote in the portable device 1 registered using said device for voting. The vote includes the choice that the voter has made, which can be a text written by the voter, preferably being generated at the voting interface 30a that is displayed on the screen of the portable device 1. Said voting interface is generated through the voting module 3, which may or may not be implemented in the portable device 1 or in the polling server 6.

Before casting the vote from the portable device, the voter must select (300) at least two distinct codes, A and B, from the plurality of random codes 20a and 20b received in the portable device 1, wherein said plurality of random codes 20a and 20b has been generated in the module of codes 2, which may or may not be implemented in the portable device 1 or in the voting server 6.

Once the codes have been selected, the voter is authorized to cast (400) its vote and to issue (450) its identifier. The set of information including the vote and the code B selected from the plurality of random codes 20b is called voting set 10b. The information set comprised of the identifier obtained from the portable device that may correspond to the IMEI of the device and code A selected from the plurality of random codes 20a is called identifier set 10a.

With the casting of the vote by the voter, the system gets the identifier set 10a of the portable device and sends (500) the voting information to the at least one polling server 6 that is in communication with the portable device 1 through the network 5. Said voting information includes the at least two separate batches of information 30b and 40b, wherein at least a first batch of separate information 30b includes the voting set 10b and the at least second batch of separate information 40b comprises the identifier set 10a of the portable device used in casting the vote. Such separate batches of information are not associable with each other. In one embodiment, the voting set 10b is sent from the voting module 3 and the identifier set of the portable device 10a is sent from the identification and verification module 4, wherein said modules 3 and 4 may or may not be implemented in the portable device 1 or in the polling server 6.

By sending the voting information in at least two separate batches of information 30b and 40b, the method is further comprised of receiving (600) the separate batches of information in the at least one polling server 6 that is in charge of processing the information contained in each batch. In this context, according to one embodiment, the at least one polling server 6 authenticates the votes cast, confirming that the B random code associated with the vote belongs to one of the predefined codes, registers the batches at random and processes the voting count. Moreover, the at least one voting server 6 verifies that the identifiers of the portable devices 1 that have issued a vote are duly registered in the database 7 corroborating that the random code A associated with the identifiers of the portable devices 1 belongs to one of the predefined codes, registers the batches at random and processes the attendance count. In this regard, the at least one polling server 6 acts as coordinating voting unit and counting unit, and separate servers or machines can be used for such work.

In the next step, the method of the invention consider printing (700), in the at least one printing device 8, the separate batches of information received in at least one polling server 6, leaving a paper trail 8a and 8b, where the paper trail is randomly generated by the voting server and/or printing device that randomly compiles them, making impossible the association between the different paper trails, which act as a backup to the electronic voting.

Figure 6:
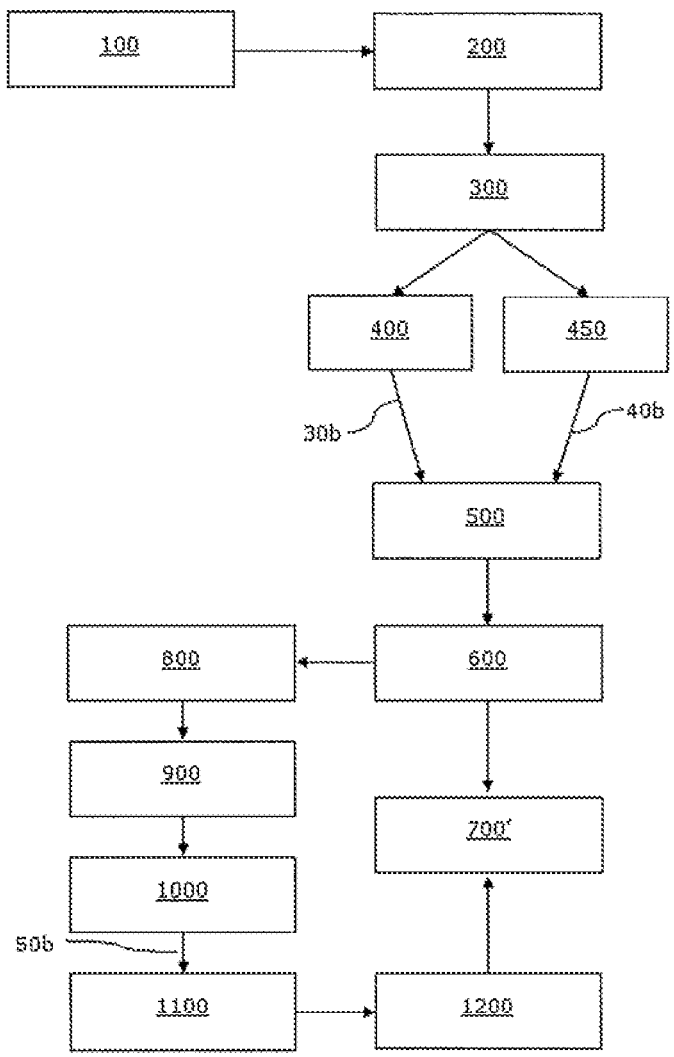
FIG. 6 shows a scheme of the method of the invention implemented in the system of FIG. 2.

One embodiment of the method of the invention, shown in FIG. 6 and which is complemented by the method of FIG. 4, provides for the verification (800) by the voter, that their vote and participation were recorded correctly once the results are published on the Internet and/or Intranet. Once the results are published on the Internet and/or Intranet, the server poll 6 notifies the voter—for example through email—to consult the Internet and/or Intranet using the codes A and B previously selected, and determine if their vote and participation were properly recorded.

Then, the voter generates (900) their verification in the portable device 1 registered. The verification is comprised of the voter's confirmation or rejection of the results published, preferably generated at the verification interface 50a that is displayed on the screen of the portable device 1. The identification and verification module 4, which may or may not be implemented in the portable device 1, generates such verification interface.

Once the voter verifies their vote and participation, the voter casts (1000) their verification. The set of information including the verification and the identifier of the portable device is called verification set 10*c*.

With the issuance of the verification by the voter, the system retrieves the set of verification 10*c* of the portable device and sends (1100) the verification information to the at least one polling server 6 that is in communication with the portable device 1 by network 5. Such verification information is comprised of at least one batch of information 50*b*, which includes the set of verification 10*c* of the portable device used in the issuance of the verification. In one embodiment, the verification set 10*c* is sent from the identification and verification module 4 wherein said identification and verification module 4, as already mentioned, may or may not be implemented in the portable device 1 or in the server poll 6.

By sending the verification information in at least one separate batch of information 50*b*, the method is further comprised of receiving (1200) the separate batch of information in at least one polling server 6 that is in charge of processing the information contained in the batch. In this context, according to one embodiment, the at least one polling server 6 authenticates the verification, confirming that the identifiers of portable devices 1 that have issued the verification are duly registered in the database 7, registers the batch and processes the verification counting. In this regard, the at least one polling server 6 acts as coordinating voting unit and counting unit, and separate servers or machines can be used for such work.

In the last step, the method of the invention consider printing (700'), all separate batches of information received in at least one polling server 6, in the at least one printing device 8, leaving a paper trail 8*a*, 8*b* and 8*c*, which acts as a backup to the electronic voting. In this context, the paper trails 8*a* and 8*b* correspond to those generated from the sending (500) of the polling information, while the paper trail 8*c* corresponds to that generated by the sending (1000) of the verification information according to the present embodiment.

In addition, alternative embodiments of the invention consider that in order to access the voting interface 30*a* and verification interface 50*a*, the user must log into this voting interface 30*a* and verification interface 50*a* using a secure connection to initiate communication with the at least one polling server 6. In the online mode, connection is initially established to carry out the whole process of voting in direct connection with the at least one polling server 6, using the portable device 1 to verify that the portable device is properly registered and as a means of entering information, while in the offline mode the connection is initially performed to verify that the portable device is properly registered by its identifier, for voting, with the voting or verification being performed without a direct connection with the at least one polling server 6.

Considering this, the online mode requires that communication between the portable device 1 and the polling server 6 is set during voting and verification, with the information being sent and received according to the method proposed. Here, after the separate batches of information have been generated that correspond to the identifier set of the portable device 10*a*, the voting set 10*b* and the verification set 10*c*, said batches of information are instantly communicated by the at least one voting server 6, with the voting set acting as a coordinating unit or the machine acting as counting unit, where such units may be part of the same polling server 6. The counting unit updates the electronic voting results and coordinates the printing of the paper trails 8*a*, 8*b* and 8*c* corresponding to separate batches of information 30*b*, 40*b* and alternatively 50*b*, respectively, where such coordination is performed by the voting server 6 or directly with the at least one printing device 8.

Instead, the offline mode comprises that communication between the portable device 1 and at least one polling server 6 may be established only for sending information, which means that the portable device 1 becomes much more relevant in the voting process acting as a polling interface itself rather than an input device as in the online mode. Indeed, in the offline mode the portable device 1 is validated in communication with the poling server 6 acting as a voting coordinating unit, which, according to one embodiment, sends information (6*a*, 6*b*, 6*c* and alternatively, 6*d*) necessary for the voting process to be started in the portable device 1. Then, the connection between the polling server 6 and the portable device 1 may be ended. Once the modules 2, 3 and 4 of the portable device receive the information 6*a*, 6*b*, 6*c*, and alternatively, 6*d*, the voting process is initiated using the voting interface 30*a* to cast the vote. Then, the portable device, through modules 3 and 4, generates the separate batches of information 30*b* and 40*b* corresponding to the voting set 10*b* and the identifier set 10*a*, and alternatively, the separate batch of information 50*b* for the set of verification 10*c*. Said batches of information are then communicated to the at least one polling server 6 acting as counting unit, starting a new secure connection, wherein the said at least one polling server 6 starts the process of updating the results of the electronic voting and printing paper trails corresponding to the separate batches of information.

Furthermore, the invention considers that communication between the at least one polling server 6 and the portable device 1 is performed by a software implemented in the portable device 1 or in the at least one polling server 6 wherein said software consists of the modules of the present invention.

It should be noted that the present invention is applicable both for voting and opinion or preference polls. Thus, the terms "electors", "voters" and "vote" used in the present application should be considered as synonyms or including such terms as "respondents," "opinion" or "preference" as used in the processes of surveys.

Finally, it should be noted that other embodiments directly associated with the method and system proposed must be understood as part of the disclosure of this application.

The invention claimed is:

1. An electronic voting method implemented in a portable device that improves voting transparency and speed, encouraging participation in the voting process, that is comprised of:
   registering an identifier code of the portable device used by the voter to vote, associating said identifier to the voter's identity, wherein said portable device is in communication with at least one module of codes, at least one identification and verification module and at least one voting module;
   generating a vote by the voter in the registered portable device, wherein the vote is the voter's choice during the voting process;
   selecting a code A by the voter from a first plurality of random codes received in the portable device and a code B from a second plurality of random codes received in the portable device;

casting the vote in a voting interface associating it with the random code B selected by the voter, where the association of said vote and said code B selected is called voting set;

issuing the identifier of the portable device in an identifier interface associating it with random code A selected by the voter, where the association of said identifier of the portable device and said code A selected is called identifier set;

sending via a network to the at least one server the voting information that is comprised of at least two separate batches of information that are not associable to each other, where:

at least a first separate batch of information is comprised of the voting set, and at least a second separate batch of information is comprised of the identifier set;

receiving the separate batches of information in the at least one server that is in charge of processing and randomly registering the information contained in each batch; and printing in at least one printing device the separate batches of information received in the at least one server, leaving a paper trail that acts as back-up for the electronic voting.

2. The electronic voting method according to claim 1, wherein through network the at least one server sends to the portable device a plurality of random codes, as well as information related to the identifiers registered and information related to the voting interface.

3. The electronic voting method according to claim 1, wherein voting is performed with the portable device in direct and instant communication with the network.

4. The electronic voting method according to claim 1, wherein voting is performed with the portable device without being in direct and instant communication with the network.

5. The electronic voting method according to claim 4, wherein the server communicates to the portable device the information related to voting only when the process has started.

6. The electronic voting method according to claim 4, wherein just after voting, the portable device sends the separate batches of information and to the at least a server.

7. The electronic voting method according to claim 1, wherein the registering step is comprised of storing the identifier of the portable device along with the identification of the voter and other data related to voting in at least one database.

8. The electronic voting method according to claim 1, Wherein the identifier of the portable device corresponds to the IMEI or another identifier of the portable device.

9. The electronic voting method according to claim 1, wherein the first plurality of random codes and/or the second plurality of random codes are received from the at least one module of codes.

10. The electronic voting method according to claim 1, wherein the voting interface is proposed by the at least one voting module and the identifier set of the portable device is obtained from the at least one identification and verification module.

11. The electronic voting method according to claim 1, wherein the plurality of random codes are predefined or generated in the at least one module of codes and they are different.

12. The electronic voting method according to claim 1, wherein the at least one module of codes obtains the plurality of random codes from at least one database of codes.

13. The electronic voting method according to claim 1, wherein the at least one server authenticates the votes cast confirming that the B random code belongs to one of the codes predefined as selected and processes the vote counting.

14. The electronic voting method according to claim 1, wherein the at least one server verifies that the identifiers obtained from the portable devices that have cast the vote are duly registered, confirming that the random code A belongs to one of the predefined codes as selected and processes the counting of identifiers.

15. The electronic voting method according to claim 1, wherein the at least one server randomly registers the at least two separate batches of information making the association among the different batches impossible according to the sequence in which they were received in the server.

16. The electronic voting method according to claim 1, wherein the printing of the separate batches of information is randomly generated by the server and/or the at least one printing device that compiles them at random, making the association among the different paper trails of the voting impossible.

17. The electronic voting method according to claim 1, wherein the step of printing is performed in at least two groups of printing devices, where said at least two groups of printing devices are separately designated to print each separate batch of information.

18. The electronic voting method according to claim 1, wherein the at least one voting module, at the least one module of codes and/or at least one identification and verification module are implemented in one single voting management module.

19. The electronic voting method according to claim 18, wherein the voting management module is implemented in the portable device.

20. The electronic voting method according to claim 1, wherein the at least one voting module, at least one module of codes and/or the at least one identification and verification module are directly implemented in the portable device.

21. The electronic voting method according to claim 1, wherein the portable device is a cell phone, smartphone or any portable device with an enabled electronic identifier.

22. The electronic voting method according to claim 1, wherein each voter may register or keep registered one single portable device.

23. The electronic voting method according to claim 1, wherein the random codes comprise numeric, alpha-numeric and/or image codes.

24. The electronic voting method according to claim 1, wherein the vote may comprise a text written by the voter using the portable device registered.

25. The electronic voting method according to claim 1, wherein the at least one server acts as coordinating voting unit and counting unit.

26. The electronic voting method according to claim 1, wherein the external servers or machines act as coordinating voting unit and counting unit.

27. The electronic voting method according to claim 1, wherein it is also comprised of the following steps:

communicating by the server to the portable device the results of voting as published on the Internet and/or Intranet;

gernerating the verification by the voter in the portable device registered;

issuing the verification in a verification interface associating it with the identifier code obtained from the portable device, where said association is called verification set;

sending via a network to at least one server verification information comprised of at least one information batch that comprises the verification set;

receiving the information batch in the at least one server in charge of processing and registering the information contained in each batch; and printing in at least one printing device the batch of information received in at least one server leaving a paper trail that acts as back-up for electronic voting, where the printing of the separate batches of information is randomly generated by the voting server and/or a printing device that compiles them at random, making the association among the different paper trails of voting impossible and leaving a paper trail that acts as back-up for electronic voting.

28. The electronic voting method according to claim 27, wherein through network the at least one server also sends information related to the verification interface.

29. The electronic voting method according to claim 28, wherein the server communicates to the portable device the information related to the voting verification only when the voting results have been counted.

30. The electronic voting method according to claim 27, wherein verification corresponds to the confirmation by the voter that the results published on Internet and/or Intranet properly reflect their votes and participation.

31. The electronic voting method according to claim 27, wherein the verification is generated at the verification interface.

32. The electronic voting method according to claim 31, wherein the verification interface is proposed by the at least one identification and verification module.

33. The electronic voting method according to claim 27, wherein the verification set comes from the at least one identification and verification module.

34. The electronic voting method according to claim 27, wherein the at least one server verifies that the identifiers obtained from portable devices that have issued verification are duly registered and processes the counting of verifications.

35. The electronic voting method according to claim 27, wherein the printing step includes leaving a paper trail in at least one printing receptacle.

36. The electronic voting method according to claim 27, wherein the printing step includes leaving a paper trail in at least one printing receptacle.

37. An electronic voting system implemented in a portable device that improves voting transparency and speed, encouraging participation in the voting process, wherein it is comprised of:

a portable device by each voter where said portable device is in communication with at least one module of codes at least one identification and verification module and at least one voting module where:

the module of codes generates a plurality of random codes for each voting, which are sent to the portable device of each voter for selection;

the at least one voting module allows a voting interface to be displayed in the portable device and, after the voting, said module receives a voting set comprised of the vote cast by each voter associated with a B random code selected by each voter;

the at least one identification and verification module allows an identification interface to be displayed in the portable device, before or after the voting, and said module receives an identifier set comprised of the single identifier obtained from the portable device with an A random code selected by each voter;

at least one server connected to a network and receiving at least two separate batches of information that are issued from the portable device, where at least a first separate batch of information is comprised of the voting set and at least a second separate batch of information is comprised the identifier set of the portable device;

at least one printing device prints a paper trail of the separate batches of information that are received in the at least one server.

38. The electronic voting to claim 37, wherein the at least one voting module, the at least one module of codes and/or the at least one identification and verification module are implemented in one single voting management module.

39. The electronic voting system according to claim 37, wherein the voting management module is implemented in the portable device.

40. The electronic voting system according to claim 37, wherein the at least one voting module, the at least one module of codes and/or the at least one identification and verification module are implemented directly in the portable device.

41. The electronic voting system according to claim 37, wherein the at least one voting module, the at least one module of codes and/or the at least one identification and verification module are directly implemented in the at least one server.

42. The electronic voting system according to claim 37, wherein it is also comprised of at least one database for registering and storing the identifiers of the portable devices associated with the identity of each voter.

43. The electronic voting system according to claim 42, wherein the database is implemented in the at least one server or available on the network.

44. The electronic voting system according to claim 42, wherein the database contains information related to voting, for example, the at least one database of random codes, the database of candidates, the database of positions for which they are running, the database of the questions to be voted, the database of voters registry, the database of the groups of voters by sector or station, etc., where said databases may comprise independent databases or one and the same general database.

45. The electronic voting system according to any claim 37, wherein the at least two separate batches of information communicate with the at least one server via the network, where the said at least server receives each separate batch of information and processes, separately, for validation, authentication and counting, and registers at least the first two batches at random, thus making the association between these two different batches impossible according to the sequence in which they were received by the server.

46. The electronic voting system according to claim 37, wherein the paper trail separately compromised of a first paper trail corresponding to the first separate batch of information and at least one second paper trail corresponding to the second separate batch of information, where the printing of the separate batches of information is randomly generated by the at least one server and/or the at least one printing device that compiles them at random, thus making the association among the different paper trails of voting impossible.

47. The electronic voting system according to claim 46, wherein it is comprised of two printing devices to print both paper trails separately, and the printing of the separate batches of information is compiled at random, thus making the association among the different paper trails of voting impossible.

48. The electronic voting system according to claim 37, wherein the at least one identification and verification module also allows a verification interface to be displayed in the portable device after voting, and said module receives a verification set comprised of the verification issued by each voter associated with the identifier obtained from the portable device.

49. The electronic voting system according to claim 48, wherein the at least one server connected to a network also receives at least one separate batch of information issued from the portable device, where said the at least separate batch of information is comprised of the verification set.

50. The electronic voting system according to claim 49, wherein the at least one separate batch of information communicates with the at least one server via the network, where the said at least one server receives the at least one separate batch of information and processes it separately for validation, authentication and counting.

51. The electronic voting system according to claim 49, wherein the paper trail is also comprised of at least a third paper trail corresponding to the third separate batch of information.

52. The electronic voting system according to claim 37, wherein it is also comprised of at least one printing receptacle where the printing device deposits the paper trail.

* * * * *